Feb. 27, 1962   N. J. TROUGHT   3,022,675

VARIABLE ANGLE GEAR DRIVE MECHANISM

Filed Sept. 28, 1959   2 Sheets-Sheet 1

Inventor:
Norman J. Trought
By. Rudolph J. Hurick
Attorney

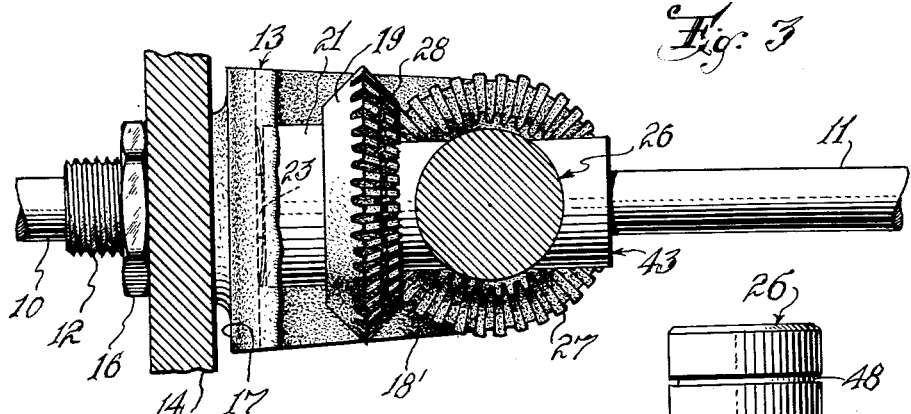
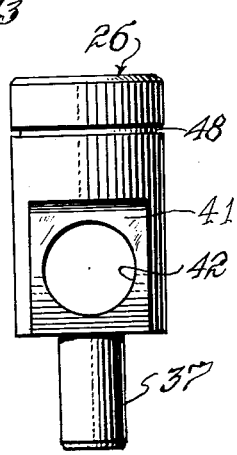
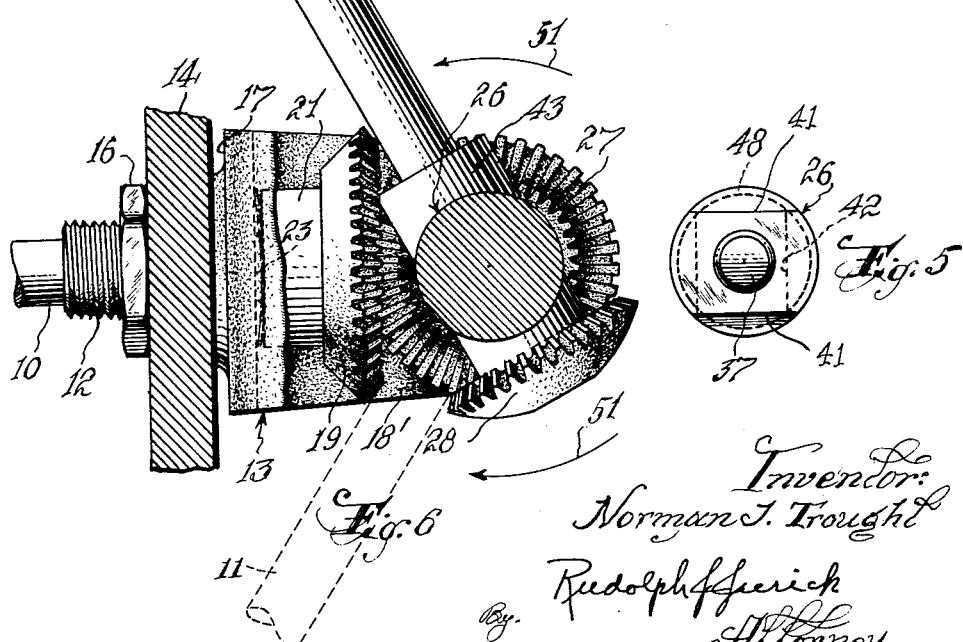

United States Patent Office 3,022,675
Patented Feb. 27, 1962

3,022,675
VARIABLE ANGLE GEAR DRIVE MECHANISM
Norman J. Trought, New Vernon, N.J., assignor to Trought Associates, Inc., Belleville, N.J., a corporation of New Jersey
Filed Sept. 28, 1959, Ser. No. 842,753
5 Claims. (Cl. 74—385)

This invention relates to a gear drive mechanism and more particularly to a variable angle gear drive mechanism which includes at least a pair of gear carrying shafts which may be swung, or adjusted to a desired angle therebetween.

In the device of my invention, the two gear carrying shafts may be arranged in alignment with each other, or may be adjusted, or pivoted in either direction from such aligned relation, through an angle of about 135°. In prior art variable gear drive arrangements, in which the input, or drive, shaft and the output, or driven shaft may be relatively variably positioned, the direction of shaft rotation is reversed in going through the gear device, i.e., the output or driven shaft rotates in the opposite direction to the rotation of the input drive shaft. In the variable angle gear device of my invention, the direction of rotation between the drive and driven shafts is unchangeable. Such an arrangement finds innumerable uses in various mechanical and electro-mechanical systems, or the like, for either the transmission of power or shaft position information. An example of one such use is in the connecting linkage between a manually or mechanically operated tuning knob and the tuned elements of a radio receiver or transmitter. It will here be understood, however, that the gear mechanism of my invention is not limited to use in any particular apparatus or device.

An object of this invention is the provision of a simple and rugged variable angle gear drive mechanism in which input and output shafts included therein may be relatively pivotally adjusted through a wide angular range.

An object of this invention is the provision of a variable angle gear drive mechanism in which the input and output shafts may be axially aligned, and in which the output shaft rotates in the same direction in which the said input shaft is rotated.

An object of this invention is the provision of a gear mechanism comprising first and second bevel gears carried adjacent the ends of first and second rotatable shafts, respectively, and a third rotatable bevel gear in engagement with the said first and second bevel gears, the said first shaft intersecting the axis of the said third bevel gear extended.

An object of this invention is the provision of a gear mechanism comprising first and second bevel gears carried adjacent the ends of first and second rotatable shafts, respectively, and a third rotatable bevel gear in engagement with the said first and second gears, the bevel extended of the gear on the said first shaft intersecting the axis of the said first shaft, while the bevel extended of the said gear on the second shaft intersects the axis extended of the said second shaft.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 3 is a top plan view of the mechanism only showing a portion of the forked housing broken away for clarity;

FIGURE 4 is a side elevational view of a center shaft employed in the novel mechanism;

FIGURE 5 is an end view of the shaft shown in FIGURE 4; and

FIGURE 6 is similar to FIGURE 3 only showing the mechanism input and output shafts angularly positioned.

Figure 1:
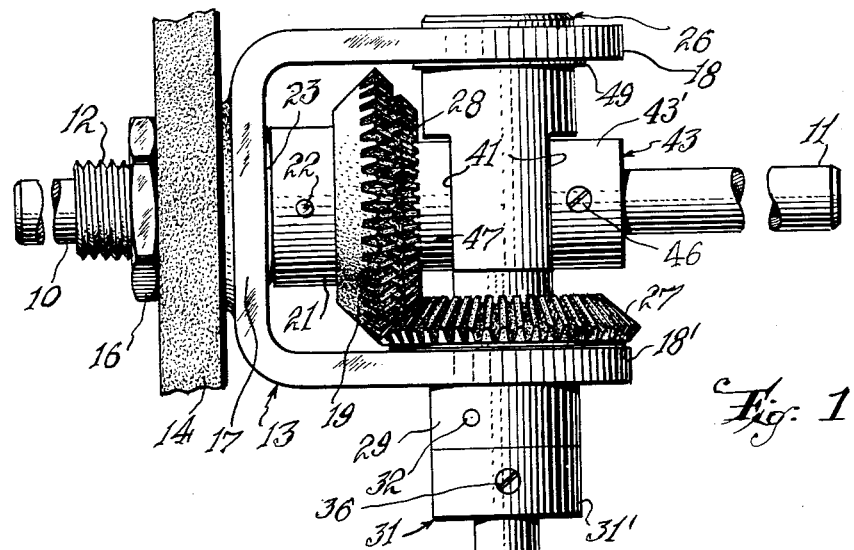
FIGURE 1 is a side elevational view of the novel variable angle gear drive mechanism embodying my invention.
Figure 2:
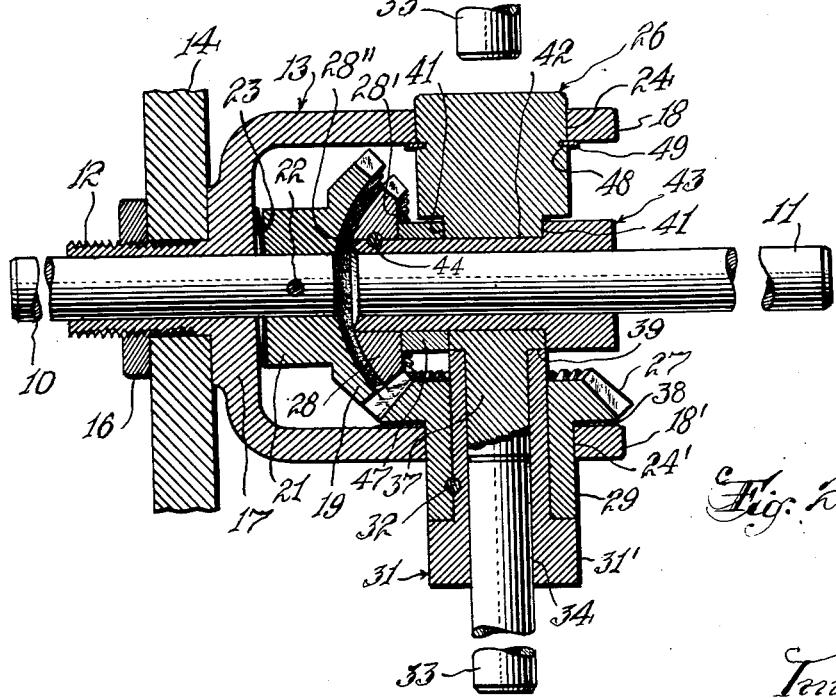
FIGURE 2 is a vertical sectional view of the mechanism.

Reference is first made to FIGURES 1–3 of the drawings wherein there is shown an input, or drive, shaft 10 which may be aligned with an output, or driven, shaft 11. The input shaft 10 is rotatably supported within the bore of a shank 12 formed on a bifurcated housing, designated 13. The outside of the shank 12 may be threaded for attachment of the mechanism to any desired supporting wall, 14, if desired, the said shank extending through an aperture in the supporting wall and secured in position thereon by a locking nut 16.

The housing 13 comprises an end wall portion 17 upon which the shank 12 is formed and a pair of generally parallel arm portions 18 and 18' extending in the same direction from the upper and lower ends of the wall 17. A bevel gear 19 having an integral shank portion 21 formed at the rear side thereof is secured to the drive shaft 10 within the housing 13 by means of a suitable locking pin 22. As used above, and through the remainder of the specification and claims, the rear, or back, side of a bevel gear refers to that side which is adjacent the enlarged diameter portion of the gear teeth formed on the bevel gear. The front side of a bevel gear as used herein, then, refers to the side adjacent the reduced diameter portion of the gear teeth.

A spring washer 23 is positioned between the end of the shank 21 and the end wall 17 to provide a biasing force on the gear 19.

Axially aligned apertures 24 and 24' are formed in the respective arm members 18 and 18' of the bifurcated housing 13. A center shaft 26 is rotatably supported in the one aperture 24 while a bevel gear 27 is rotatably supported in the aperture 24'. It will here be noted that the bevel gear 27 meshes with both the gear 19 secured to the drive shaft 10 and a second bevel gear, designated 28, which gear 28 is secured to the driven shaft 11 in a manner described hereinbelow.

The bevel gear 27 is provided with an integral shank 29 at the rear, or back, side thereof which is rotatably supported within the aperture 24'. A center bushing 31, of brass or other suitable material, extends through the axial bore in the gear 27 and integral shank 29 and is secured thereto by a pin 32. The bushing 31 is formed with an outer, enlarged outside diameter portion 31' which may abut the free end of the gear shank 29. If desired, a shaft 33 may extend into the bushing bore, designated 34, with the shaft secured thereto as by means of a set screw 36 which engages a tapped hole through the enlarged portion of the bushing. The inner end of the bore 34 in the bushing 31 rotatably supports a reduced diameter portion of the said center shaft 26; the reduced diameter portion thereof being designated by the reference numeral 37 in the drawings. A spring washer 38 positioned between the bevel gear 27 and the arm 18' biases the gear 27 with the attached bushing 31 upwardly, as viewed in FIGURE 2, wherein the inner free end of the bushing abuts the center shaft 26 at the radially extending or annular wall, designated 39, formed intermediate the ends thereof at the inner end of the reduced diameter portion of the said center shaft.

Reference is now also made to FIGURES 4 and 5 wherein it will be noted that the center shaft 26 is formed with a pair of diagonally opposite flats 41, 41 adjacent the reduced diameter end thereof. A transverse, radially extending bore 42 is formed through the center shaft 26 which bore terminates at opposite ends thereof at the flats 41, 41. As seen in FIGURE 2, a bushing 43, having an enlarged outside diameter portion 43' at the outer end thereof, is rotatably mounted within the bore 42 in the center shaft 26. The gear 28 is secured by means of an attaching pin 44 to the bushing 43 adjacent the inner free end thereof. The output shaft 11 extends into the bushing bore and is secured to the bushing by means of a set screw 46 which is threaded into a tapped hole in the wall of the enlarged diameter portion 43' of the bushing. An annular spacer member 47 is located between a flat face, designated 28', formed on the front of the gear 28, and a flat 41 on the center shaft 26. It will be apparent that axial movement of the gear 28 with the attached bushing 43 is limited by engagement of the enlarged diameter portion 43' of the bushing with the one flat 41 on the center shaft, and the engagement of the spacer 47 with the gear 28 at one end and another flat 41 at the other end. An annular groove 48 is formed in the center shaft 26, within which groove a resilient retaining ring 49 is positioned, to thereby limit the upward movement of the center shaft 26, as viewed in FIGURE 2.

It will be noted that in the description of my novel gear mechanism, the shafts 10, 11 and 33 are arbitrarily designated drive or driven (or input, output) shafts; it being here understood that any of the shafts may comprise an input shaft, with the remaining shafts comprising the output shafts. Further, the device of my invention need not include the shaft 33 which extends at right angles to the other shafts 10 and 11. In such an event, no provision for the attachment of the shaft 33 to the gear 27 would be necessary.

Although the operation of the variable angle gear drive mechanism is believed to be apparent from the above description thereof, a brief description follows. Assuming that the shaft 10 comprises the input shaft, it will be apparent that the rotation thereof will cause the intermeshing gear 27 to also rotate. Since the gear 27 also meshes with the gear 28 attached to the output shaft 11, the output shaft 11 will also be rotated upon rotation of the input shaft 10. It will be noted that the bevel gear 28 meshes with the gear 27 at the forward end of the said gear 27, while the bevel gear 19 meshes with the gear 27 at the rear end of the said bevel gear 27, with the engaged tooth of the gear 27 bridging the distance between the engaging teeth of, and a suitable clearance between, the gears 19 and 28 when the shafts 10 and 11 are in alignment, as viewed in FIGURE 2. With the novel gear arrangement of my invention, the aligned shafts 10 and 11, as viewed in FIGURE 2, rotate in the same relative direction. For example, it will be apparent that if the shaft 10 rotates in a clockwise direction, as viewed from the left in FIGURE 2, the gear 27 will be rotated in a counter-clockwise direction, as viewed from the bottom of FIGURE 2, which counter-clockwise rotation will impart a clockwise rotation to the output shaft 11, as viewed from the left in FIGURE 2. Thus, the direction of rotation of the shafts 10 and 11 is unchanged in going through the gear device (with the said gear device function in a manner analogous to a resilient spring coupling arrangement between the two shafts 10 and 11, for example). It will here be noted that although the input and output shafts 10 and 11 rotate at the same speed, the speed at which the shaft 33 rotates may be changed by changing the size of the gear 27 from that of the gears 19 and 28. That is, a 1 to 1 gear tooth ratio of the gear 27 with the gears 19 and 28 is not essential and may be changed without departing from my invention.

The extent to which the shaft 11 may be angled or angularly positioned with respect to the shaft 12 will become apparent from an examination of FIGURE 6 of the drawings, wherein the shaft 11 is shown rotated about the axis of the center shaft 26 in a counter-clockwise direction to a position wherein a small clearance is provided between the outwardly extending shaft 11 and the gear 19. As shown in broken lines, the shaft 11 may be rotated in the opposite direction an equal amount whereby the shaft 11 may be positioned anywhere within an arc, designated 51, of somewhat less than 270°. It will be apparent that the output shaft 11 may reciprocate, and continue to reciprocate about the axis of the center shaft 26 while being driven by either the shaft 10 or 33.

In order to provide clearance between the gears 19 and 28 for the angular rotation of the shaft 11 about the center shaft axis, it will be noted that the forward face, designated 19', of the gear 19 (as seen in FIGURE 2) is concaved. The use of a convex rear surface, designated 28'', on the gear 28, however, is obviously not essential. The gear 28 is strengthened by the additional material provided by the said concave face which extends rearwardly of the gear 28 and, in addition, the anchor pin extends through such concave rearward extension of the gear. It will also be apparent that the need for a concave front surface 19' on the gear 19 would be eliminated by spacing the gears 19 and 28 a further, sufficient, spaced distance apart, but with both in meshing engagement with a suitable gear 27.

Having now described my invention in detail, in accordance with the requirements of the patent statutes, various other changes and modifications will suggest themselves to those skilled in this art. It is intended that such changes and modifications shall fall within the spirit and scope of the invention as recited in the following claims.

I claim:

1. In a gear device comprising first and second alignable shafts respectively having first and second bevel gears attached thereto, and a third bevel gear intermeshing with the said first and second bevel gears, the said first and second gears having the same number of teeth and the shaft of the second gear mounted to angle about the axis of the third gear, so that the first and second gears may lie close to and coaxial with one another, with the front of one gear disposed alongside the back of the other gear, and the teeth of said gears simultaneously engaging the same tooth of the third gear and bridged thereby.

2. The invention as recited in claim 1 including a third shaft secured to the said third bevel gear and rotatable therewith upon rotation of the said first and second shafts.

3. In a gear device comprising first and second alignable shafts respectively having first and second bevel gears attached thereto, and a third bevel gear intermeshing with the said first and second bevel gears, the said first and second gears having the same number of teeth and the shaft of the second gear mounted to angle about the axis of the third gear, so that the first and second gears may nest one before the other on the same axis, with the first gear and the second gear forming the lower and upper sections, respectively, of a cone, so as to engage the same tooth of the third gear and act as one gear when in alignment, at the same time effectively locking the first shaft to the second shaft for turning in the same direction.

4. A variable angle gear device comprising first and second shafts having first and second bevel gears attached thereto adjacent the ends thereof, means rotatably mounting the said shafts, means pivotally mounting one of the shafts about in an axis normal to the said one shaft axis, the back of the said first bevel gear facing in the direction of the outwardly extending first shaft and the front of the said second bevel gear facing in the direction of the outwardly extending second shaft, and a third level gear rotatable about the said pivot axis of the said pivotally mounted shaft, the said third bevel gear intermeshing with the said first and second bevel gears; the said first and second shafts rotating in the same relative rotary direction upon rotation of one of the said shafts when the said first and second shafts are in axial alignment.

5. A variable angle gear device comprising a housing which includes a pair of spaced wall members interconnected by a connecting wall, a first shaft extending through the said connecting wall and rotatable therein, a first bevel gear secured to the said first shaft within the housing, the rear face of the said first gear being positioned in the direction of the outwardly extending first shaft, a center shaft pivotally mounted between the said pair of spaced wall members of the housing with the axis thereof normal to the axis of the first shaft, means forming a radially extending transverse bore through the said center shaft, means rotatably mounting a second shaft in the center shaft bore, a second bevel gear attached to the said second shaft within the said housing with the front of the said second gear facing in the direction of the outwardly extending second shaft, and a third bevel gear rotatably mounted on one of the said housing wall members and intermeshing with the said first and second bevel gears.

References Cited in the file of this patent

UNITED STATES PATENTS

| | | |
|---|---|---|
| 66,052 | Smith | June 25, 1867 |
| 273,226 | Coffield | Feb. 27, 1883 |
| 1,970,652 | Hammitt | Aug. 21, 1934 |
| 2,235,427 | Harris | Mar. 18, 1941 |

FOREIGN PATENTS

| | | |
|---|---|---|
| 1,009,032 | France | May 26, 1952 |